UNITED STATES PATENT OFFICE.

HYYM E. BUC, OF ROSELLE, NEW JERSEY, ASSIGNOR TO STANDARD OIL COMPANY, OF BAYONNE, NEW JERSEY, A CORPORATION OF NEW JERSEY.

PRODUCTION OF PENTACHLORACETONE.

1,391,757. Specification of Letters Patent. Patented Sept. 27, 1921.

No Drawing. Application filed November 4, 1920. Serial No. 421,729.

*To all whom it may concern:*

Be it known that I, HYYM E. BUC, a citizen of the United States, residing at Roselle, in the county of Union and State of New Jersey, have invented a new and useful Improvement in the Production of Pentachloracetone, of which the following is a specification.

The present invention relates to processes for the production of pentachloracetone and will be clearly understood from the following description thereof.

In accordance with the present invention mixtures of chloracetones comprising dichloracetone (asym.) and trichloracetone with smaller, varying proportions of sym. tetrachloracetone and of pentachloracetone, are formed by the reaction of chlorin upon isopropyl alcohol in the presence or absence of water under controlled conditions to minimize the formation of chlorinated hydrocarbons. The proportion of pentachloracetone in such mixtures is always small. The mixture of chloracetones, previously separated from the material from which it is produced, is in turn subjected to the action of chlorin, preferably while maintaining a temperature of 70° to 100° C. in the presence of water. Water is added to the reacting mixture in such quantities that the HCl produced in the reaction will form therewith a solution having a concentration of approximately 20% HCl.

In forming the mixture of chloracetones above referred to I prefer to utilize the procedure described in my co-pending application Ser. No. 421730, filed of even date herewith. Isopropyl alcohol, which may be anhydrous or may contain water, is subjected to the action of chlorin, preferably in excess, while maintaining a temperature between 35 and 70° C., and preferably 65° C. Under these conditions the formation of chlorinated hydrocarbons is minimized. The reaction may be carried out in any suitable manner, for example, by passing chlorin into a body of isopropyl alcohol or by passing chlorin through a temperature controlled tower in countercurrent to a descending current of the alcohol. The liquid products of reaction are collected and separate by gravity into a heavier, oily layer consisting chiefly of chloracetones and a lighter, aqueous or alcoholic layer containing chloracetones in solution. The chloracetones may be salted out from this solution by the addition of suitable inorganic compounds, for example, NaCl or CaCl$_2$, and on separation may, if desired, be added to the oily layer above referred to or may be treated separately. The vapor products of reaction may be collected, for example, by absorption in water, in which case the absorber liquid separates into two layers; a heavier, oily layer comprising chiefly mixed chloracetones and an aqueous layer containing HCl. These mixtures of chloracetones may be treated separately or may preferably be combined with those earlier mentioned. The mixed chloracetones have a specific gravity of 1.45 to 1.50 and consist chiefly of di and trichloracetone (such as 1.3.3), with smaller, but varying quantities of tetra and pentachloracetones. When it is attempted to directly chlorinate isopropyl alcohol to pentachloracetone large quantities of highly chlorinated hydrocarbons are formed.

The mixed chloracetones are placed in a suitable receptacle and chlorin is passed through, water having previously been added. The amount of water may vary, but should not be excessively large, in which case a considerable part of the chloracetones will be dissolved in it. A volume of water equal to that of the chloracetones is found to be satisfactory. During the passage of the chlorin the heat is applied to maintain a temperature of 70 to 100° C. A substantially complete conversion of the lower chloracetones into pentachloracetone is effected in 48 to 60 hours. During the progress of the reaction HCl is formed and it is preferred to add water in such amounts that the HCl concentration of the aqueous solution remains at approximately 20%. The pentachloracetone readily separates from the aqueous liquid by reason of its greater density.

It is readily apparent that the process may be made wholly or semi-continuous by causing the chlorin and the chloracetones to travel in countercurrent through a series of treating receptacles.

Although the present invention has been described in connection with details of procedure for carrying it into effect, it is not intended that these details shall be regarded as limitations upon the scope of the invention, except in so far as included in the accompanying claims.

I claim:

1. The process of preparing pentachloracetone which consists in subjecting isopropyl alcohol to the action of chlorin under conditions controlled to produce chloracetones, separating the chloracetones and subjecting them to the action of chlorin to effect their conversion into pentachloracetone.

2. The process of preparing pentachloracetone which consists in subjecting isopropyl alcohol to the action of chlorin at a temperature between 35 and 70° C., separating the chloracetones formed, and subjecting them to the action of chlorin while maintaining a temperature above 70° C., thereby effecting their conversion into pentachloracetone.

3. The process of preparing pentachloracetone which consists in subjecting isopropyl alcohol to the action of chlorin at a temperature between 35 and 70° C., separating the chloracetones formed, and subjecting them to the action of chlorin while maintaining a temperature of 70 to 100° C. and in the presence of water sufficient to form a solution of the HCl derived from the reaction, of 20% concentration, thereby effecting conversion of the chloracetones into pentachloracetone.

4. The process of preparing pentachloracetone which comprises bringing chlorin into reacting relation with lower chlorinated acetones at a temperature above 70° C.

5. The process of preparing pentachloracetone which comprises bringing chlorin into reacting relation with lower chlorinated acetones at a temperature between 70° C. and 100° C.

6. The process of preparing pentachloracetone which comprises bringing chlorin into reacting relation with lower chlorinated acetones at a temperature above 70° C., and adding water to effect solution of hydrochloric acid formed in the reaction.

7. The process of preparing pentachloracetone which comprises bringing chlorin into reacting relation with lower chlorinated acetones and adding water to form a solution of 20% concentration of the HCl formed in the reaction.

HYYM E. BUC.